United States Patent Office 3,838,033
Patented Sept. 24, 1974

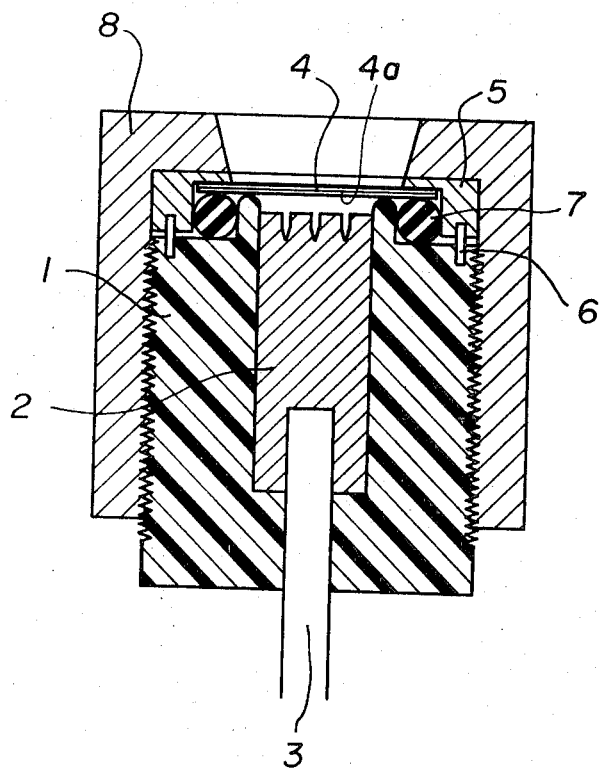

3,838,033
ENZYME ELECTRODE
Wolfgang Mindt, Therwil, Philippe Racine, Munchenstein, and Peter Schlapfer, Therwil, Switzerland, assignors to Hoffmann-La Roche Inc., Nutley, N.J.
Filed Aug. 31, 1972, Ser. No. 285,765
Claims priority, application Switzerland, Sept. 9, 1971, 13,211/71
Int. Cl. G01n 27/46
U.S. Cl. 204—195 B                          7 Claims

ABSTRACT OF THE DISCLOSURE

An enzyme electrode for determining the concentration of substances occurring in intermediate metabolism comprising an electrochemical sensor, a layer in contact with the sensor and containing an enzyme and an acceptor, and a semipermeable membrane covering the layer. In other embodiments, the acceptor is shown to be present either partially in undissolved form or in dissolved form contained in a layer of porous material.

BACKGROUND OF THE INVENTION

Field of the Invention

This invention relates to an enzyme electrode for determining the concentration of substances occurring in intermediate metabolism, more particularly glucose concentration.

Description of the prior art

The prior art enzyme electrodes usually consist of an electrochemical sensor (for example a Pt electrode, a glass electrode, etc.), a semipermeable membrane and an intermediate layer containing an enzyme. Measurement is carried out with the substrate diffusing through the membrane and entering into an enzymatic reaction in the region of the enzyme layer. The concentration of an electrochemically active reactant or reaction product is simultaneously measured with the electrochemical sensor. The concentration measured is related to the substrate concentration in the solution under test, the relationship being determined by calibration of the system.

The prior art measuring methods using enzyme electrodes can be divided up into two categories, determined by whether a third specific reactant, for example, a coenzyme, in addition to the substrate and enzyme, is or is not included in the enzyme reaction.

For example, a third reactant of this kind is not required in the splitting of urea into ammonium and $CO_2$ with the enzyme urease acting as the catalyst. In an enzyme electrode for urea, the ammonium ions liberated as a result of the splitting are determined directly by a membrane electrode responding to the ions.

In contradistinction, the enzyme electrodes according to the invention are systems of the first category, more particularly those in which the enzyme catalyses the oxidation of an organic compound, for example, the oxidation of glucose to gluconic acid, or the oxidation of lactate to pyruvate. Generally, an oxidation of this kind is coupled with the reduction of another substance which is usually referred to as the acceptor. A coupled process of this kind can be described by the following reaction equation:

$$S + A_{ox} \xrightarrow{E} P + A_{red} \quad (1)$$

wherein S and P denote the substrate and the product of the enzyme reaction, $A_{ox}$ and $A_{red}$ denote the oxidized and the reduced form of the acceptor, and E denotes the enzyme.

In the case of glucose determination by means of the enzyme glucose-oxidase, a number of methods are known which are based on the use of oxygen, the natural acceptor for this enzyme. For example, it has been proposed to determine the oxygen consumption during the enzyme reaction by means of a Clark electrode which has been brought into close contact with an enzyme layer. A measurement of this kind is, however, greatly dependent upon the oxygen partial pressure in the surroundings of the electrode and thus of only limited use in physiological solutions in which the oxygen partial pressure varies. Although it has been suggested to correct the error caused by fluctuations in the oxygen partial pressure, by using a second Clark electrode coated as similarly as possible with a layer of deactivated enzyme, such a measuring method is very complex experimentally and is, therefore, unsuitable in clinical use for routine measurements.

Another possibility is to oxidize on a platinum anode the $H_2O_2$ forming during the enzymatic oxidation of glucose in the presence of oxygen. Owing to the decomposition of $H_2O_2$ by catalase which is present in traces, it is difficult to carry out this oxidation quantitatively so that the measurement is accompanied by an error which is difficult to determine. Unless special precautions are taken, the measurement is also similarly dependent upon the oxygen partial pressure in the surroundings of the electrode as in the above-mentioned case. To keep the oxygen partial pressure constant, it has already been proposed to bring some of the enzyme layer into contact with a hydrophobic oxygen-permeable membrane. Oxygen gas is passed along the back of this hydrophobic membrane, diffuses through the membrane into the enzyme layer and keeps the oxygen partial pressure there at a constant level. Such an electrode construction is very complicated, however, and therefore unsuitable in clinical use for routine measurements. In addition, the complex nature of this system makes it impossible to miniaturize, the latter being necessary for use for in-vivo measurement (e.g. intravasal use).

To obviate all these difficulties associated with the use of oxygen as acceptor in enzyme electrodes for measuring glucose, it has also been proposed to use other acceptors introduced into the test solution, for example, p-benzoquinone or hexacyanoferrate (III). The disadvantage of this, however, is that the test solution, for example, the blood sample, must be mixed with a specific quantity of this reagent before the measurement, and this entails additional labor. This method is also unsuitable in principle for in-vivo measurement.

SUMMARY OF THE INVENTION

The use of the enzyme electrodes according to the invention is to determine the concentration of the reduced or oxidized form of the acceptor, $A_{ox}$ or $A_{red}$, electrochemically, and thus indirectly obtain a measure of the concentration of the substrate in the solution under test to provide an enzyme electrode which has none of the disadvantages known to enzyme electrodes and which is very suitable for measuring glucose.

This problem is solved by an enzyme electrode which consists essentially of an electrochemical sensor, a layer in contact therewith and containing an enzyme and an acceptor, and a semipermeable membrane covering said layer. Advantageously, the acceptor is mainly contained in the solid undissolved form between the membrane and the electrochemical sensor. The concentration of the dissolved acceptor in the enzyme layer thus stays at an adequate value for the enzyme reaction over a relatively long period. If there were no such excess of acceptor in undissolved form a quantity of dissolved substance initially added to the enzyme layer would within a short time be lost due to diffusion through the membrane into the test solution and thus cause the enzyme electrode to become unserviceable. The presence of the undissolved form has the effect that the quantity lost due to diffusion from the membrane is compensated by freshly dissolved substance. Another possibility of maintaining the required acceptor concentration in the enzyme layer over a long period is to provide a reservoir which communicates with the enzyme layer and which contains the acceptor in dissolved form. Advantageously, the reservoir may contain a porous material, for example, a polymer, to receive the dissolved acceptor. The dissolved acceptor can also be stored in a reservoir in thickened form.

Under steady state conditions the acceptor concentration occurring within the enzyme layer is determined mainly by the solubility of the acceptor, its speed of dissolution, and the permeability of the membrane for the acceptor. It has been found very advantageous that it is possible to select these three parameters substantially independently of one another to ensure optimum conditions for a given enzyme electrode.

BRIEF DESCRIPTION OF THE DRAWING

The figure shows a cross-section view of an enzyme electrode forming one part of the present invention.

DESCRIPTION OF THE PREFERRED EMBODIMENT

A manner of ensuring optimum conditions of a given enzyme electrode, is to select the parameters of: the solubility of the acceptor; its speed of dissolution; and, the permeability of the membrane of the acceptor, as specified below.

The acceptor concentration in the enzyme layer is put in the optimum region for the relevant enzyme reaction. An excessive concentration may result in the enzyme reaction being inhibited while an inadequate acceptor concentration results in saturation of the electrode sensitivity even at low substrate concentrations.

As described above, care is taken to ensure that the acceptor concentration in the enzyme layer is maintained over the longest possible period. It is also important that the diffusion of the acceptor from the electrode only takes place very slowly. More particularly, the quantity emerging must remain below the toxicity limit for *in-vivo* measurements.

Various known organic and inorganic redox systems for which the coupling with the enzyme reaction as in equation (1) is possible kinetically may be used as acceptors. More particularly, in the case of the glucose electrode, it is important that the reduction of the acceptor should take place sufficiently rapidly as compared with the reduction of oxygen which may take place as a competing reaction. Only then can the interference of oxygen be eliminated.

The reduced form of the acceptor must also be stable and be capable of quantitative electrolytic reoxidation. The acceptor must additionally have the required solubility. In the event of excessive solubility binders may be used (for example, polyvinyl alcohol or polystyrene) or micro-encapsulation to reduce the speed of dissolution and hence reduce the acceptor concentration in the enzyme layer.

Examples of substances suitable as acceptors are certain redox dyes, difficultly soluble hexacyanoferrate (III) or quinones, more particularly monosubstituted p-benzoquinones. Very suitable acceptors for the substrate glucose are, for example, 2,6-dichlorphenolindophenol sodium, methylene blue, pyocyanin perchlorate and p-toluquinone. Chrome (III) - hexaantipyrine - hexacyanoferrate (III), phenol blue or thionin, are particularly suitable, for example, as acceptor for the substrate L-lactate.

The reoxidation of the reduced acceptor is determined amperometrically. The current measured is in relationship to the substrate concentration. In the ideal case this relationship is linear. A solid electrode, for example, platinum, is suitable as electrochemical sensor.

The semipermeable membrane must satisfy the following requirements. It must be impermeable to the enzyme and its permeability to the substrate must be kept at a low value in order to obtain a linear relationship between the measured current and the substrate concentration in the test solution. By using a membrane having a low permeability it is also possible to ensure that the calibration curve within the low substrate concentration range becomes independent of the enzyme concentration in the enzyme layer. This avoids any drift of the calibration curve as a result of a decrease in enzyme activity within certain limits in the course of time.

In order to obtain a short enzyme electrode response time to variations in substrate concentration despite the required low membrane permeability to the substrate, the membrane thickness and the partition coefficient of the membrane to the substrate must be small, while the diffusion coefficient of the membrane to the substrate must be at a maximum, and this is in line with membrane theory.

Suitable material for the semipermeable membrane is, therefore, regenerated cellulose, cellulose acetate (various degrees of hydrolysis) or polyvinyl alcohol. Depending upon special requirements, the membranes may be interlaced in various ways, bear charges or be co-polymerized with other compounds, more particularly by coating a suitable carrier.

It will be appreciated that, in having a membrane comprised of a carrier and a semi-permeable coating, it is inherent from such an arrangement that the carrier be fully permeable, because otherwise, it would influence the permeability of the membrane, and thus would not be a true carrier structure.

An enzyme electrode for glucose determination and the measurement which can be performed with this electrode will be described hereinafter with reference to the accompanying drawing as an exemplified embodiment of the invention.

With reference to FIG. 1, there is shown one end face of a cylindrical plastics block 1 used as a holder which has a cylindrical recess surrounded by an annular projection. A platinum cylinder 2 is disposed in the recess and serves as an electrochemical sensor. A connecting line 3 leads out from the platinum cylinder through the plastics block 1 and is used for connection to a conventional ammeter. The surface of the platinum cylinder is approximately 0.2 mm. beneath the edge of the projection and has recesses to receive the acceptor, which in this case is 2,6-dichloroindophenol sodium. The enzyme glucose oxidase dissolved in a buffer solution or fixed on a carrier material, is disposed in the space between the surface of the platinum cylinder and the membrane. A membrane 4 of regenerated cellulose which may be coated on a suitable carrier 4a, is pressed by a retaining ring 5 against the edge of the projection and a rubber O-ring 7 disposed outside the projection, and the assembly is retained by metal pins 6 and a screw-on cap 8.

For measurement purposes, the electrode is immersed into the temperature-controlled solution (for example, whole blood, serum, plasma, urine, etc.). The platinum cylinder in the enzyme electrode is connected via a voltage source (polarization voltage 300 to 400 mv.) and an ammeter to a reference electrode (for example, a silver chloride electrode). After a response time of 5–15 minutes depending upon the membrane, ninety-five percent is obtained of the end deflection of a current proportional to the glucose concentration, proportionality being obtained up to glucose concentrations of about 600 mg./100 ml. (normal blood sugar content 90 mg./100 ml.)

For a glucose concentration of 500 mg./100 ml., the stability of this electrode per unit of time is more than 60 hours. Miniaturization of this electrode is technically easily possible for in-vivo measurements. In that case, a thermistor would be additionally incorporated for temperature measurement, to enable the influence of temperature fluctuations on the measured value to be compensated. Of course, other substrates, for example L-lactate, can be determined with a corresponding enzyme electrode. For L-lactate detremination, for example, the enzyme used was L-lactate dehydrogenase (cytochrome $b_2$) and the acceptor was chrome (III) hexaantipyrine-hexacyanoferrate (III). After a response time of 1 to 3 minutes (depending upon the membrane), ninety-five percent were obtained of the end deflection of a current proportional to the L-lactate concentration, there being proportionally up to L-lactate concentrations of 180 mg./100 ml. (normal L-lactate content of the blood: 7 mg./100 ml.). The stability of this electrode per unit of time is at least 8 hours. for an L-lactate concentration of 130 mg./100 ml.

We claim:

1. An enzyme electrode for determining the concentration of substances occurring in intermediate metabolism comprising:
   electrochemical sensor means;
   a layer means in contact therewith and containing an enzyme and an acceptor;
   semipermeable membrane means covering said layer; and
   the acceptor partially present in undissolved form.

2. An enzyme electrode according to claim 1 whereby the acceptor is a redox dye, a difficultly soluble hexacyanoferrate (III) or a monosubstituted p-benzoquinone.

3. An enzyme electrode according to claim 2, whereby the acceptor for the substrate glucose is 2,6-dichlorphenolindophenol sodium, methylene blue, pyocyaninperchlorate or p-toluquinone.

4. An enzyme electrode according to claim 2, whereby the acceptor for the substrate L-lactate is chrome (III) hexaantipyrine hexacyanoferrate (III), phenol blue or thionine.

5. An enzyme electrode according to claim 1 whereby said membrane includes regenerated cellulose, cellulose triacetate or polyvinyl alcohol.

6. An enzyme electrode according to claim 5, whereby said membrane includes a fully permeable carrier structure and a semipermeable coating.

7. An enzyme electrode according to claim 1 whereby said electrochemical sensor includes a surface having recesses containing the undissolved acceptor.

References Cited

UNITED STATES PATENTS

| | | | |
|---|---|---|---|
| 3,623,960 | 11/1971 | Williams | 204—1 T |
| 3,334,039 | 8/1967 | Vlasak | 204—195 P |
| 3,272,725 | 9/1966 | Garst | 204—1 T |
| 3,454,485 | 7/1969 | Hauk et al. | 204—195 P |
| 3,539,455 | 4/1970 | Clark | 204—1 T |
| 3,591,480 | 7/1971 | Neff et al. | 204—195 |

OTHER REFERENCES

David L. Williams, et al., Anal. Chem., vol. 42, No. 1, pp. 118–121 (1970).

GERALD L. KAPLAN, Primary Examiner

U.S. Cl. X.R.

204—195 P